(12) United States Patent
Wu et al.

(10) Patent No.: US 11,256,746 B2
(45) Date of Patent: Feb. 22, 2022

(54) HASH-BASED EFFICIENT SECONDARY INDEXING FOR GRAPH DATA STORED IN NON-RELATIONAL DATA STORES

(71) Applicant: Oracle International Corporation, Redwood Shores, CA (US)

(72) Inventors: Zhe Wu, Mountain View, CA (US); Gabriela Montiel Moreno, Zapopan (MX); Jiao Tao, Mountain View, CA (US); Jayanta Banerjee, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 15/494,141

(22) Filed: Apr. 21, 2017

(65) Prior Publication Data

US 2017/0308621 A1    Oct. 26, 2017

Related U.S. Application Data

(60) Provisional application No. 62/327,392, filed on Apr. 25, 2016.

(51) Int. Cl.
*G06F 16/901* (2019.01)
*G06F 16/22* (2019.01)
*G06F 16/2457* (2019.01)

(52) U.S. Cl.
CPC ...... *G06F 16/9024* (2019.01); *G06F 16/2255* (2019.01); *G06F 16/24575* (2019.01)

(58) Field of Classification Search
CPC ............. G06F 16/9024; G06F 16/2255; G06F 16/24575
See application file for complete search history.

(56) References Cited

U.S. PATENT DOCUMENTS 5,963,642 A    10/1999  Goldstein
7,873,660 B1   1/2011   Wong et al.
(Continued)

FOREIGN PATENT DOCUMENTS

WO   WO 2015/041967 A1   3/2015

OTHER PUBLICATIONS

U.S. Appl. No. 14/052,622, filed Oct. 11, 2013, Office Action, dated Aug. 25, 2015.

(Continued)

*Primary Examiner* — Aleksandr Kerzhner
*Assistant Examiner* — Aryan D Toughiry
(74) *Attorney, Agent, or Firm* — Hickman Becker Bingham Ledesma LLP

(57) ABSTRACT

A method and apparatus for a graph database instance (GDI) maintaining a secondary index, that indexes data from a sparse data map storing graph application data, within a sparse data map dedicated to the secondary index. The GDI formulates row-keys, for the secondary index map, by hashing the values of key/value pairs stored in rows of a map storing application data. The GDI stores for each formulated row-key, in the row of the secondary index that is indexed by the formulated row-key, references to rows of the map storing application data that match the key/value pair on which formulation of the row-key was based. The row-keys into the secondary index map may incorporate bucket identifiers, which, for each key/value pair, allows the GDI to spread the references to graph elements that match the key/value pair among a set number of "buckets" for the key/value pair within the secondary index map.

24 Claims, 7 Drawing Sheets

(56) References Cited

U.S. PATENT DOCUMENTS

| | | | |
|---|---|---|---|
| 8,433,701 B2 | 4/2013 | Sargeant et al. | |
| 8,458,191 B2 | 6/2013 | Bhattachadee et al. | |
| 10,747,739 B1* | 8/2020 | Muniswamy Reddy | ............. G06F 16/23 |
| 2003/0084043 A1 | 5/2003 | Acharya et al. | |
| 2003/0135495 A1* | 7/2003 | Vagnozzi | ............ G06F 16/31 |
| 2004/0117396 A1 | 6/2004 | Avadhanam et al. | |
| 2004/0148293 A1* | 7/2004 | Croisettier | ........ G06F 16/2272 |
| 2004/0148308 A1 | 7/2004 | Rajan | |
| 2005/0204141 A1 | 9/2005 | Sayers et al. | |
| 2008/0040365 A1 | 2/2008 | Harvey | |
| 2008/0114733 A1 | 5/2008 | Friesenhahn | |
| 2008/0120281 A1 | 5/2008 | Marceau et al. | |
| 2008/0154541 A1 | 6/2008 | Gemulla et al. | |
| 2008/0222087 A1 | 9/2008 | Balmin et al. | |
| 2009/0132474 A1 | 5/2009 | Ma et al. | |
| 2009/0254516 A1 | 10/2009 | Meiyyappan | |
| 2009/0254532 A1 | 10/2009 | Yang | |
| 2009/0292716 A1 | 11/2009 | Oliver et al. | |
| 2010/0036862 A1 | 2/2010 | Das et al. | |
| 2010/0036864 A1 | 2/2010 | Augenstein | |
| 2010/0241644 A1 | 9/2010 | Jackson et al. | |
| 2010/0306591 A1 | 12/2010 | Krishna | |
| 2011/0099174 A1 | 4/2011 | Chappell et al. | |
| 2012/0166402 A1* | 6/2012 | Pederson | ........ G06F 16/24554 707/692 |
| 2012/0179698 A1 | 7/2012 | Muras | |
| 2012/0310916 A1 | 12/2012 | Abadi et al. | |
| 2013/0238667 A1 | 9/2013 | Carvalho et al. | |
| 2013/0275656 A1* | 10/2013 | Talagala | ............ G06F 12/0246 711/103 |
| 2014/0019490 A1 | 1/2014 | Roy et al. | |
| 2014/0297621 A1 | 10/2014 | Hu et al. | |
| 2014/0310302 A1* | 10/2014 | Wu | .............. G06F 16/532 707/769 |
| 2014/0372090 A1 | 12/2014 | Lee et al. | |
| 2015/0088924 A1 | 3/2015 | Abadi | |
| 2015/0106382 A1 | 4/2015 | Liu et al. | |
| 2015/0317345 A1* | 11/2015 | Liu | .............. G06F 16/278 707/741 |
| 2016/0092779 A1* | 3/2016 | Werth | ............. G06N 3/0445 706/48 |
| 2017/0147664 A1 | 5/2017 | Bussler | |
| 2017/0230171 A1* | 8/2017 | Gadepally | ........... H04L 9/0894 |

OTHER PUBLICATIONS

U.S. Appl. No. 14/052,622, filed Oct. 11, 2013, Notice of Allowance, dated Mar. 14, 2016.

U.S. Appl. No. 13/893,018, filed May 13, 2013, Office Action, dated May 21, 2015 U.S. Appl. No. 13/893,018, filed May 13, 2013, Final Office Action, dated Jul. 23, 2015.

Bussler, U.S. Appl. No. 14/946,489, filed Nov. 19, 2015, Office Action, dated May 29, 2018.

Wikipedia, "NoSQL" http://en.wikipedia.org/wiki/NoSQL#Key-value_stores, last viewed on Nov. 19, 2015, 11 pages.

Valle et al., "Page: A Distributed Infrastructure for Fostering RDF-Based Interoperability", dated Oct. 16, 2006, 8 pages.

Roth et al., "Don't Scrap it, Wrap it! A Wrapper Architecture for Legacy Data Sources", VLDB Conference, dated 1997, 10 pages.

Oracle NoSQL Database, An Oracle White Paper, Oracle, dated Sep. 2011, 12 pages.

Neumann et al., "The RDF-3X Engine for Scalable Management of RDF Data", The VLDB Journal dated 2010, 24 pages.

Ladwig et al., "Cumulus RDF: Linked Data Management on Nested Key-Value Stores", SSWS, dated 2011, 13 pages.

Kulkarni, Prasad, "Distributed Sparql Query Engine Using MapReduce", Masters of Science University of Edinburh, dated 2010, 64 pages.

Harth et al., "Optimized Index Structures for Querying RDF from the Web", IEEE, dated 2005, 10 pages.

Fowler, Adam, "NoSQL for Dummies for Dummies", dated 2015, John Wiley and Sons, Inc., 46 pages.

Faye, C. David, "A Survey of RDF Storage Approaches", ARIMA Journal vol. 15, dated Feb. 2012, 26 pages.

Delconte, Seth, Null-Friendly: Using Sparse Columns and Column Sets in SQL Server, dated Jul. 10, 2012, pp. 1-10.

Apache Hbase, "Reference Guide", https://hbase.apache.org/book.html, dated Apr. 17, 2017, 301 pages.

Bussler, U.S. Appl. No. 14/946,489, filed Nov. 19, 2015, Notice of Allowance, dated Mar. 11, 2019.

Bussler, U.S. Appl. No. 14/946,489, filed Nov. 19, 2015, Interview Summary, dated Feb. 5, 2019.

Bussler, U.S. Appl. No. 14/946,489, filed Nov. 19, 2015, Final Office Action, dated Dec. 26, 2018.

Wang, Wendy, et al., "Investigating Memory Optimization of Hash-index for Next Generation Sequencing on Multi-core Architecture", 2012 IEEE 26th IP&DPSW, pp. 665-674, downloaded May 13, 2021, 10 pgs.

Science Buddies, "Probability and the Birthday Paradox", Bring Science Home, Scientific American, https://www.scientificamerican.com/article/bring-science-home-probability-birthday-paradox/, Mar. 29, 2012, 7pgs.

Oracle Data Sheet, "Oracle Big Data Spatial and Graph", copyright 2017, 6pgs.

Chang, Fay, et al., "Bigtable: A Distributed Storage System for Structured Data", 7th USENIX Symposium on OSDI, pp. 205-218, 2006, 14pgs.

* cited by examiner

FIG. 3

DATA MAP 310A

| ROW-KEY | KEY/VALUE PAIRS |
|---|---|
| 0021 | FIRST_NAME/"JOHN"; LAST_NAME/"SMITH"; STATE/"CA"; . . . |
| 0022 | FIRST_NAME/"TOM"; LAST_NAME/"WU"; STATE/"NY"; . . . |
| 0023 | FIRST_NAME/"SUE"; LAST_NAME/"MILLER"; JOB/"CARPE . . . |

DATA MAP 310B

| ROW-KEY | KEY/VALUE PAIRS |
|---|---|
| 0021 | FIRST_NAME/"JOHN"; LAST_NAME/"SMITH"; STATE/"CA"; . . . |
| 0022 | FIRST_NAME/"TOM"; LAST_NAME/"WU"; STATE/"NY"; . . . |
| 0023 | FIRST_NAME/"SUE"; LAST_NAME/"MILLER"; JOB/"CARPE . . . |
| 0024 | FIRST_NAME/"JOHN"; LAST_NAME/"SMITH"; STATE/"MO" |

FIG. 4

SECONDARY INDEX 410

| ROW-KEY | KEY/VALUE PAIRS | |
|---|---|---|
| ... | ... | ... |
| 0x55CCCC | 0021/NULL; 0024/NULL; ... | |
| ... | ... | ... |

BUCKETIZED SECONDARY INDEX 420

| ROW-KEY | KEY/VALUE PAIRS | |
|---|---|---|
| ... | ... | ... |
| 0x55CCCC02 | 0021/NULL; ... | |
| 0x55CCCC03 | 0024/NULL; ... | |
| 0x55CCCC04 | B17D/NULL; ... | |

HASH-BASED EFFICIENT SECONDARY INDEXING FOR GRAPH DATA STORED IN NON-RELATIONAL DATA STORES

BENEFIT CLAIM; RELATED APPLICATIONS

This application claims the benefit of Provisional application 62/327,392, filed Apr. 25, 2016, the entire contents of which is hereby incorporated by reference as if fully set forth herein, under 35 U.S.C. § 119(e).

This application is related to application Ser. No. 13/893,018, titled "Storing And Querying Graph Data In A Key-Value Store" and filed May 13, 2013, the entire contents of which is hereby incorporated by reference as if fully set forth herein. Furthermore, this application is also related to application Ser. No. 14/946,489, titled "In-Memory Key-Value Store for a Multi-Model Database" and filed Nov. 19, 2015, the entire contents of which is hereby incorporated by reference as if fully set forth herein.

FIELD OF THE INVENTION

The present invention relates to secondary indexes on graph data stored within non-relational data stores, and more specifically to creating secondary indexes, on graph data stored in non-relational sparse data maps, within secondary index sparse data maps.

BACKGROUND

Increasingly, there is a need to model, within database data, resources (such as documents, people, physical objects, abstract concepts, etc.) and connections between the resources. This kind of information is referred to as graph data, where the resources are represented as "nodes" or "vertices" within the graph data, and the connections between resources are represented as "edges". Storing data as graph data is especially useful to configure the stored data to respond to queries about relationships between resources. For example, social graph data that models person resources as vertices (among other resources, such as companies, schools, etc.) and the relationships between those resources as edges are especially good for gathering data for queries such as "Who are the friends of people who graduated from a particular high school in the class of 1997?" or "In what fields of work are former employees of a particular company currently engaged?".

In order to model graph data, a data store stores an entry for each unique resource (which includes information describing the resource), and an entry for each unique relationship (again, with information describing the relationship), and also information about how the stored resources relate to the stored edges. This style of data organization is known as a graph data store, where the graph data store organizes information for resources and edges (both of which are graph data elements), and also for relationships between the graph data elements.

For example, FIG. 1 depicts a simple property graph example 100 that has two vertices and one edge. Vertex 110 has the properties name and age, while vertex 120 has the properties company name and location. The edge is a directional edge from the outgoing vertex 110 to the incoming vertex 120. The edge has a text label "is a current employee of" and a property type identifying the type of relationship between vertices 110 and 120.

In order to record this property graph, the graph data store stores, within a vertex storage structure, an entry for "John Smith" (which includes, e.g., his name, age, and any other metadata describing the person resource, such as social security number, residence, level of education, etc.) and an entry for BigCorp, Inc. (which, in turn, includes the name of the company resource, location, and any other metadata describing the company resource). The data store further stores, within an edge storage structure, an entry for the predicate "is a current employee of". The data store also stores, within a graph data store, an entry that defines the desired graph relationship, i.e., where the "John Smith" resource is identified as the outgoing vertex of a relationship, the "BigCorp, Inc." resource is identified as the incoming vertex of the relationship, and the "is a current employee of" edge is identified, in the relationship, as the directional connection between the two vertices.

Graph data may be stored in non-relational data stores, which are non-relational at least in part because they are not bound by defined columns as are relational data stores. An example of a non-relational data store is a sparse, distributed, persistent, multidimensional sorted map (referred to herein as a "sparse data map"). Sparse data maps comprise a set of rows that are indexed by unique sortable strings called row-keys, where each row stores an arbitrary amount of information that is not bound by defined columns. Sparse data maps are configured for speedy lookup of the stored information using the row-keys as a primary index. Furthermore, sparse data maps are horizontally-scalable (e.g., across database shards), and as such provide low latency, elastic scalability, and high availability when accessing the data stored therein.

Disadvantageously, there can be limited support for secondary indexing, which provides an index on information in a sparse data map other than the primary row-key index, for non-relational data stores storing data in sparse data maps. For example, Apache HBase (which implements a version of sparse data maps) has no support for secondary indexing. When secondary indexing is not supported for sparse data maps, the only efficient way to query this kind of data store is using the row-keys. However, row-key-based queries generally do not allow for finding row entries that match particular data stored within the rows of the sparse data map. Without secondary indexing, in order to identify those rows in a sparse data map that match particular data criteria is via an expensive map scan in which all of the rows of data stored in the map are scanned to identify matching rows.

It would be beneficial to expand support for secondary indexing for sparse data maps to facilitate the common use case of finding rows that match given search criteria.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts sparse data maps, each of which includes a set of rows storing information for vertices of graph data.

FIG. 4 depicts secondary indexes that index information in the sparse data maps.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one or more embodiments, a database management system maintains a secondary index, that indexes data from a sparse data map storing graph-style application data, within a separate sparse data map dedicated to the secondary index. This secondary indexing support for graph data allows the database management system to quickly identify graph data, stored in the sparse data maps, that matches certain criteria identified in the secondary index.

The database management system formulates row-keys, for the secondary index map, by hashing the values of key/value pairs stored in the rows of a sparse data map (storing application data) being indexed in the secondary index. The database management system then stores for each formulated row-key, in the row of the secondary index that is indexed by the formulated row-key, references to rows of the sparse data map (storing application data) that match the key/value pair on which formulation of the row-key was based.

According to embodiments, the hash function used to hash the key of the key/value pair is different than the hash function used to hash the value of the key/value pair. According to further embodiments, the row-keys into the secondary index map further incorporate sequential bucket identifiers, which, for each key/value pair, allows the database management system to spread the references to application data that matches the key/value pair among a set number of "buckets" for the key/value pair within the secondary index map.

Storing Data Using Sparse Data Maps

Figure 1:
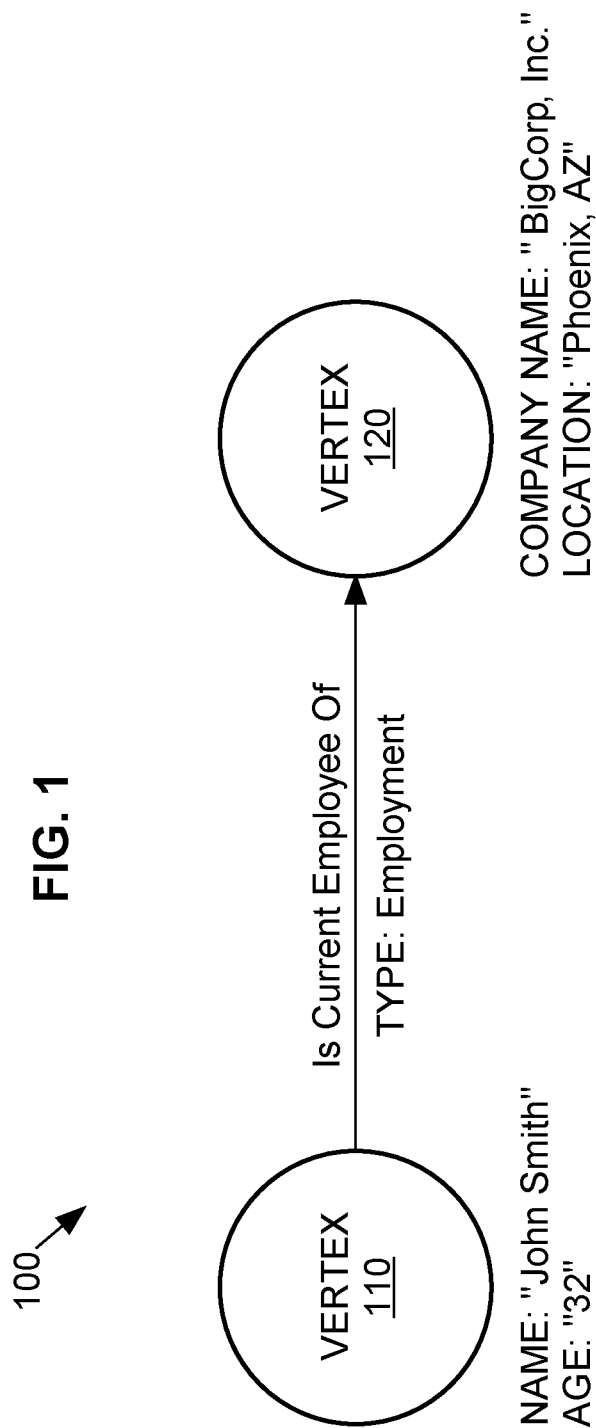
FIG. 1 depicts a simple property graph example that has two vertices and one edge.
Figure 2:
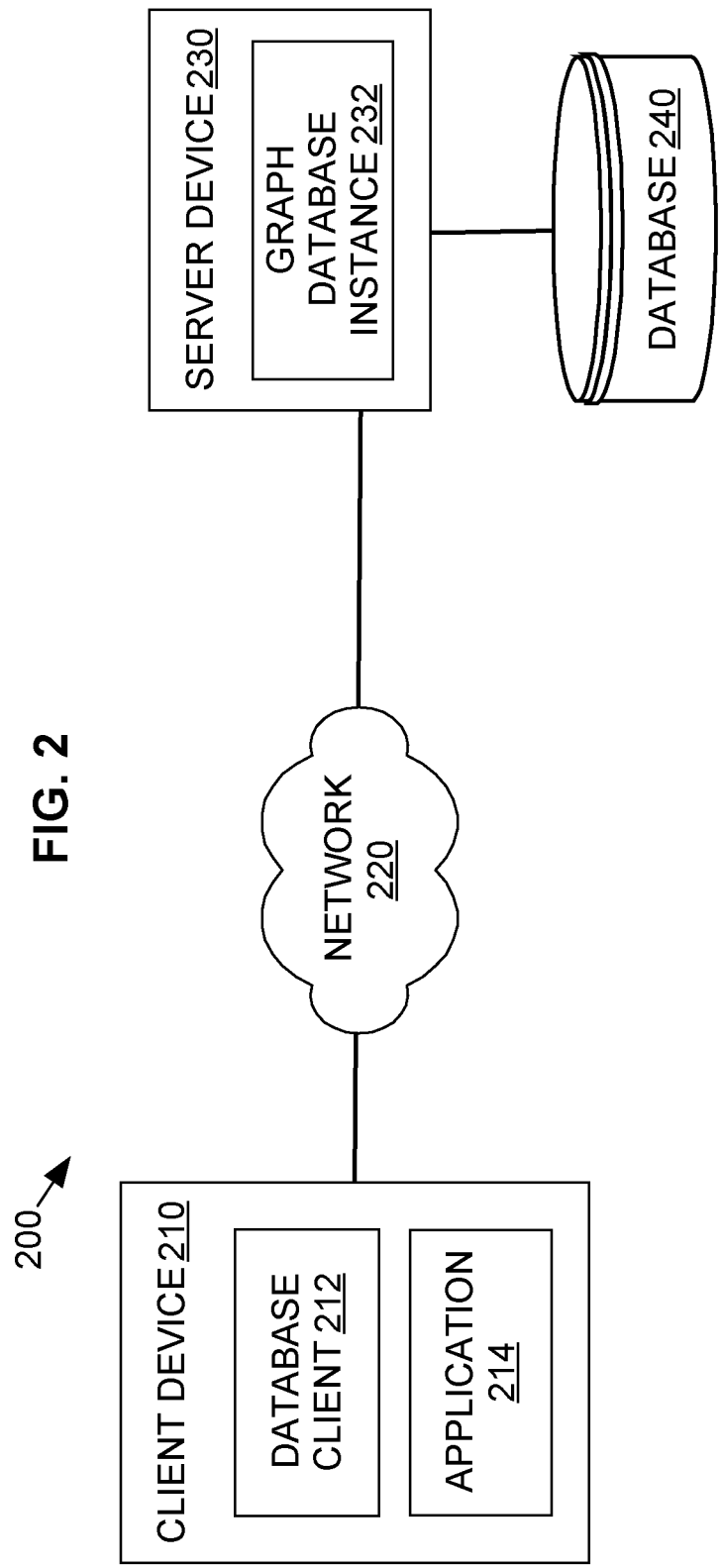
FIG. 2 depicts an example database management system that maintains secondary indexes for graph data stored within sparse data maps.

A database management system stores graph data by storing information about each graph element (i.e., each vertex and edge) and also storing edge information that encodes the relationships between the graph elements. FIG. 2 depicts an example database management system 200 that that maintains secondary indexes for graph data stored within sparse data maps in database 240. Database 240 includes one or more sparse data maps storing information about vertices, as well as one or more sparse data maps storing information about edges.

According to the example database management system 200 of FIG. 2, the information about vertices and edges is application data generated by application 214 running on client device 210. Specifically, application 214 generates and utilizes application graph data that is stored in database 240. Application 214 uses database client 212, also running on client device 210, to interface with graph database instance 232 in order to manage the data in database 240 on behalf of application 214.

FIG. 3 depicts sparse data maps 310A and 310B, each of which includes a set of rows storing information for vertices of graph data generated by application 214. Each row of sparse data map 310 is (a) indexed by a row-key, and (b) associated with a variable number of key/value pairs. According to embodiments, each of the key/value pairs in a given row represents a particular "column" and "column value" for the graph entity represented by the row. For example, the row in sparse data map 310 with the row-key "0021" stores a set of key/value pairs that includes a first key/value pair: first_name/"John". The key of this pair is "first_name" and the value of this pair is "John". Row "0021" also includes at least a second key value pair (last_name/"Smith") and a third key value pair (state/"CA"). According to embodiments, the rows in sparse data map 310 need not include all the same key types and also the key/value pairs may be stored in any order, variously, within the rows.

The key/value pair interpretation of the variable-length data stored within rows of the sparse data maps, as described above, is exemplary and does not necessarily limit embodiments. Specifically, applications may interpret the data stored in a row of a sparse data map in any way.

Secondary Indexing

Many times, sparse data maps are implemented in systems that do not provide native support for secondary indexing, such as native support for B-tree indexes. A secondary index provides fast lookup, for a data structure, based on data other than the primary index of the structure (which, in the case of sparse data maps, is the row-key).

According to embodiments, graph database instance 232 automatically creates a secondary index, for sparse data maps storing application data within database 240, using the same sparse data map data structure. Specifically, graph database instance 232 creates a sparse data map within database 240, as depicted by secondary indexes 410 and 420 in FIG. 4, and populates the sparse data map with secondary index information. Embodiments take advantage of the speed of row-key indexing in a sparse data map by encoding the feature on which application data is indexed within the row-keys of the secondary index sparse data map.

Figure 5:
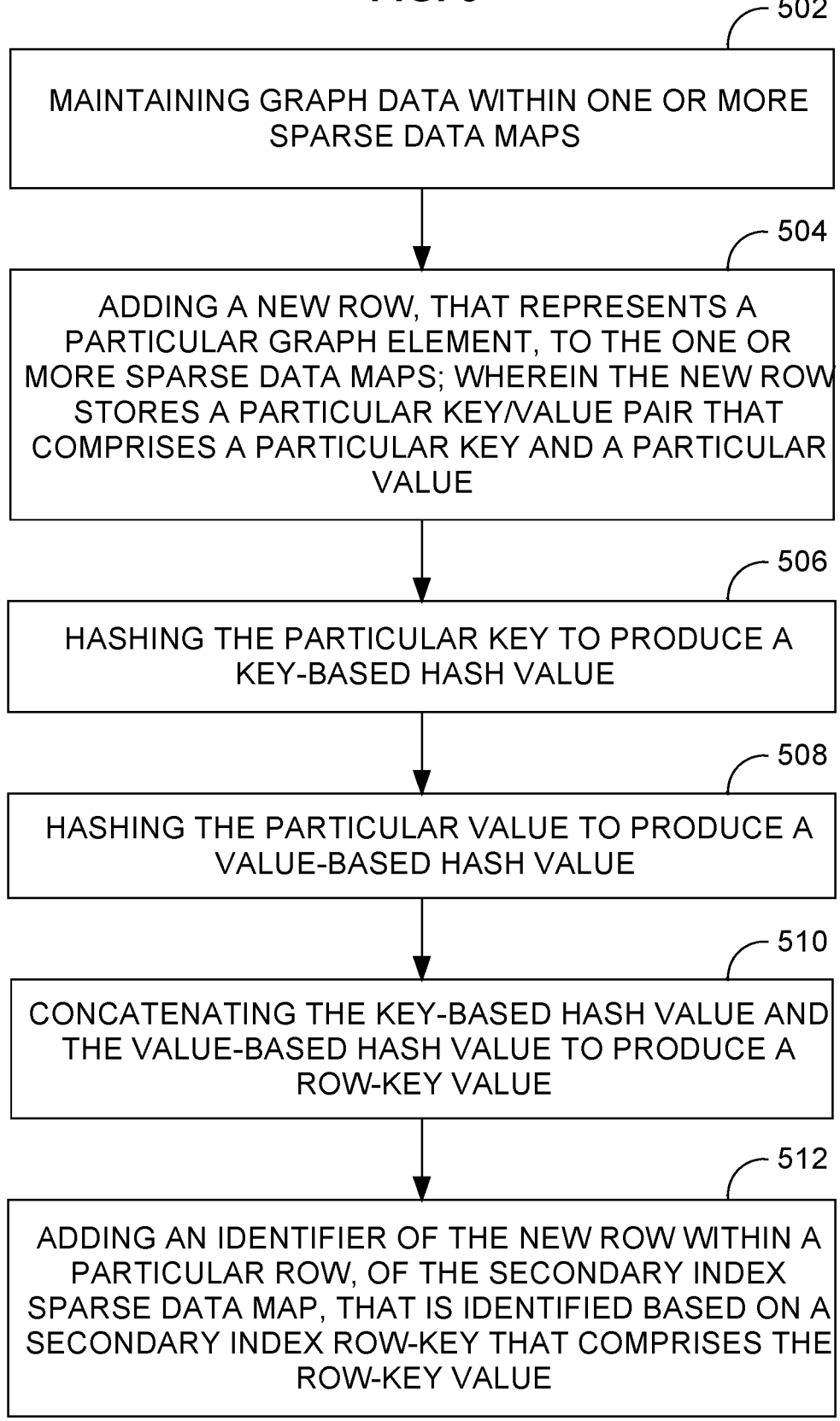
FIG. 5 depicts a flowchart for adding information to a row of a secondary index sparse data map, where the row-key for the row of the secondary index includes hash values calculated based on the key and value of an indexed key/value pair.

To illustrate, FIG. 5 depicts a flowchart 500 for adding information to a row of a secondary index sparse data map, where the row-key for the row of the secondary index includes hash values calculated based on the key and value of an indexed key/value pair. Specifically, at step 502, graph data is maintained within one or more sparse data maps. For example, graph database instance 232 maintains graph-type application data, generated by application 214, within sparse data map 310A as described above.

At step 504, a new row, that represents a particular graph element, is added to the one or more sparse data maps, where the new row stores a particular key/value pair that comprises a particular key and a particular value. For example, application 214 communicates, to database client 212, a request to store in database 240 information for a new particular vertex to represent a resource associated with the following key/value pairs: first_name/"John"; last_name/"Smith"; state/"MO".

In response to receiving the request, database client 212 relays the request to graph database instance 232. In turn, graph database instance 232 executes a DML command, such as an "insert" DML command, over sparse data map 310A within database 240, which causes insertion of the data for the new vertex (including the key/value pairs associated with the vertex) into sparse data map 310A to produce sparse data map 310B. Graph database instance 232 may quickly look up the new data within sparse data map 310B using the row-key "0024" that is assigned to the row storing data for the new vertex.

In response to graph database instance 232 adding a new row to sparse data map 310, database management system 200 automatically maintains a secondary index sparse data map, which indexes data from sparse data map 310, by performing steps 506-512 of flowchart 500. According to one or more embodiments, functions attributed to graph database instance 232 herein having to do with maintaining the secondary index sparse data map are performed by one or more computer system processes, executing secondary index software that causes the processes to maintain the secondary index sparse data map as described in detail below.

Specifically, at step 506, the particular key of the particular key/value pair is hashed to produce a key-based hash value. At step 508, the particular value of the particular key/value pair is hashed to produce a value-based hash value. At step 510, the key-based hash value and the value-based hash value are concatenated to produce a row-key value.

For example, graph database instance 232 automatically maintains a secondary index 410 (of FIG. 4) that indexes data from sparse data map 310. Maintaining a secondary index requires graph database instance 232 to update secondary index 410 when new data is inserted into sparse data map 310.

Graph database instance 232 generates the row-keys of secondary index 410 based on the various key/value pairs stored for vertices in sparse data map 310. To illustrate, new row "0024" in sparse data map 310 is eligible for three entries in secondary index 410. In other words, graph database instance 232 includes, in secondary index 410, three references to row "0024" in rows associated with row indexes that are derived from each of the three key/value pairs stored in row "0024".

As illustration of generating a secondary index row-key, graph database instance 232 generates a row-key that is to be associated with the entry, for row "0024", within secondary index 410 based on the key/value pair: first_name/"John". Specifically, graph database instance 232 generates a hash value using the key of the key/value pair (i.e., "first_name") and generates a second hash value using the value of the key/value pair (i.e., "John"). Graph database instance 232 concatenates the two hash values together to produce at least a portion of a secondary index row-key in which a reference to row "0024" is to be stored.

For example, the hash value produced based on "first_name" is 0x55 and the hash value produced based on "John" is 0xCCCC. Thus, the concatenated row-key based on those hash values is 0x55CCCC. This example uses very short hash values in order to simplify explanation of flowchart 500.

According to one or more embodiments, graph database instance 232 uses different hash algorithms to produce the hash value based on the key of the key/value pair and to produce the hash value based on the value of the key/value pair. Using different hash algorithms takes advantage of the different cardinalities of keys vs. the values that may be associated with the keys within key/value pairs. For example, the cardinality of keys tends to be much smaller than the cardinality of all possible values that could be associated with the keys within key/value pairs.

Thus, according to an embodiment, database management system 200 employs an 8-byte uniform hash algorithm, which is robust enough to incur almost no collision in practice because the number of distinct attribute keys (such as first_name, last_name, state, sex, hobby, salary, weight, height, color, etc.) is usually less than 1000. Further, according to embodiments, database management system 200 employs a 16-byte SHA1 hash algorithm to hash the values of key/value pairs, which again incurs almost no collision in practice, even for trillions of distinct values. Use of the 8-byte hash algorithm and the SHA1 hash algorithm are non-limiting examples, and even stronger hash algorithms, such as SHA-256 or SHA-512, may be employed according to embodiments.

Utilization of hash values based on both keys and values of key/value pairs creates row-keys that are of fixed length. This can be very beneficial in that the content of both keys and values of key/value pairs may be provided by users. As such, the key and/or value of any given key/value pair may be very big in size. If the row-keys of secondary index 410 were created by simply concatenating the key and value of the key/value pair being indexed, then there is the potential to have very long row-keys, which are sub-optimal for both database management system performance and storage.

At step 512, an identifier of the new row is added within a particular row, of the secondary index sparse data map, that is identified based on a secondary index row-key that comprises the row-key value. Continuing with the previous example, graph database instance 232 includes a reference to row "0024" of map 310 within a row of secondary index 410 associated with the row-key 0x55CCCC.

According to embodiments, to include the reference to row "0024" within secondary index 410, graph database instance 232 searches for a row within secondary index 410 that has the row-key 0x55CCCC. If such a row does not exist, graph database instance 232 adds a new row to the sparse data map for index 410 with the row-key 0x55CCCC and populates the new row in secondary index 410 with the row-key of the row to be indexed from sparse data map 310 (i.e., "0024"). However, if a row in index 410 with the row-key 0x55CCCC already exists within index 410, as depicted in FIG. 4, then graph database instance 232 adds the row-key for the row to be indexed (i.e., "0024") to the existing row.

According to the example depicted in FIG. 4, the payload of a given row of secondary index 410 is interpreted as key/value pairs. As such, a reference to a row within index 410 is represented as a key/value pair with the row-key for the indexed row as the key of the key/value pair and NULL as the value of the key/value pair. However, the representation of the row-key reference within the payload of a secondary index row may be done in other ways, according to embodiments.

At query (index lookup) time, for a given key/value pair, graph database instance 232 computes the hash values for the key and value for the desired key/value pair using the same hash algorithms used to encode the row-key. Graph database instance 232 creates the secondary index row-key at lookup time as described above.

Bucketized Secondary Index

Under the approach described above in connection with flowchart 500, references to all matching graph elements are stored in a single row of secondary index 410 indexed by the data from the key/value pair. However, there are potentially indefinite matching graph elements for a single key/value pair. For example, in the social graph modeled in example sparse data map 310, many vertices may represent resources with the same first_name/"John" key/value pair. Although sparse data maps are generally designed to host thousands to hundreds of thousands of key/value pairs per row, placing millions or tens of millions of data references in the same row will cause efficiency issues for the database management system.

As such, one or more embodiments spread references to graph elements that match a particular key/value pair among a set number of "buckets" for the key/value pair within the secondary index sparse data map. FIG. 4 depicts a bucketized secondary index 420 in which there are multiple row-keys generated from a given key/value pair, all of which include a distinct bucket identifier (from a pre-determined range of bucket identifiers). This addition of the bucket identifier to the secondary index row-keys spreads the references that match the given key/value pair among a set number of buckets dictated by the bucket identifier range.

For example, upon determining that a reference to a given graph element is to be included in secondary index 420 based on a given key/value pair of the graph element, graph database instance 232 identifies a bucket identifier (e.g., randomly, in round-robin fashion, etc.) that is within a pre-determined range of buckets that are to be created for each key/value pair. Such a pre-determined range of buckets may be set by a database administrator. According to an embodiment, graph database instance 232 picks a bucket identifier from the range 0 (0x00) to 31 (0x1F), which allows for 32 buckets for any given key/value pair within secondary index 420.

Graph database instance 232 concatenates the bucket identifier to either the end or the beginning of the string of hash values generated from a given key/value pair. To illustrate in the context of sparse data map 310, graph database instance 232 has generated the value 0x55CCCC for the secondary index row-key for row "0024" of map 310 with respect to the key/value pair: first_name/"John". Graph database instance 232 randomly selects the bucket identifier 0x03 to be included in the secondary index row-key for row "0024". Graph database instance 232 concatenates the bucket identifier 0x03 to the end of the composite value 0x55CCCC to produce the bucketized secondary index row-key 0x55CCCC03. Graph database instance 232 adds a reference to row "0024" within a row of secondary index 420 associated with the row-key 0x55CCCC03 as described above.

As shown in secondary index 420, the bucket identifier selected for index "0024" from map 310 (i.e., 0x03) is different from the bucket identifier selected for index "0021" from map 310 (i.e., 0x02), which also has the key/value pair first_name/"John". Further, the bucket identifier selected for index "B17D" from map 310 (i.e., 0x04), which also has the key/value pair first_name/"John", is different from the other two selected bucket identifiers. These three graph elements from map 310, that have the same key/value pair (i.e., first_name/"John"), are distributed among the three depicted buckets allocated for that key/value pair. Given 32 possible bucket identifiers selected randomly (or in round-robin fashion), other graph elements in sparse data map 310 that have the same key/value pair (i.e., first_name/"John") will all be distributed among the 32 buckets for the key/value pair. Of course, references to many graph elements may be included in each bucket for the key/value pair in bucketized secondary index 420.

In the context of a sharded database, concatenating the bucket identifier to the end of the secondary index row-key basically guarantees that all of the buckets for a particular key/value pair will be located within the same database shard of database 240. However, if desired, concatenating the bucket identifier to the beginning of the secondary index row-key basically guarantees that all of the buckets for a particular key/value pair will spread across all shards of database 240 that store secondary index 420.

As with non-bucketized secondary indexes, at query (index lookup) time, for a given key/value pair, graph database instance 232 computes the hash values for the key and value for the desired key/value pair using the same hash algorithms used to encode the row-key. However, with bucketized secondary indexes, in order to retrieve all references to graph elements that match a given key/value pair, graph database instance 232 issues multiple GET requests to cover all possible bucket identifier values for the given key/value pair. This step can be executed in parallel, e.g., where each GET request can be executed by a separate processor against a separate row or database shard.

Collision Avoidance

Even given very robust hash algorithms, it is possible that two different key/value pairs may hash to the same value. As such, according to further embodiments, potential collisions are handled by including a collision identifier in colliding secondary index row-keys. For example, after the construction of a given row-key for a particular key/value pair, graph database instance 232 queries secondary index 420 (or 410) to read a row identified by the given row-key. Graph database instance 232 retrieves the row, from map 310, that matches the reference stored in the row (from the secondary index) and determines whether the row from map 310 includes the key/value pair based on which the given row-key was generated. If the row from map 310 has the same key/value pair, then there is no collision and the new reference is added to the secondary index under the given row-key as described above.

However, if the referenced row does not include the key/value pair based on which the given row-key was generated, then graph database instance 232 has detected a collision. In response to detecting the collision, graph database instance 232 concatenates a collision identifier, starting at 0x1, to the end of the row-key and repeats the process of determining whether there is a collision using the adjusted row-key. If there is another collision, graph database instance 232 increments the collision identifier within the row-key. Once a non-colliding row-key is found, the new reference is added to the secondary index using the non-colliding adjusted row-key.

At query time, after accessing H (hash value, with bucket #) as the row-key, it is necessary to check if H-1 (which is the Hash value with bucket # and an additional collision identifier of 1) exists as a row-key in the secondary index. Query performance can be preserved by performing this test in parallel with other threads. If H-1 exists within the secondary index, then the process continues with H-2, but the possibility of H-2 existing within the secondary index is vanishingly small.

Extensions/Additions

According to embodiments, an administrator specifies one or more particular types of information on which a secondary index is to be constructed. For example, an administrator configures secondary index 410 to only index key/value pairs with the key "first_name". In this example, graph database instance 232 automatically determines whether a new row added into map 310 includes a key/value pair with the key "first_name" and, as such, is eligible to be indexed in secondary index 410. To illustrate, new row "0024"

within sparse data map 310 includes a key/value pair with the key "first_name" and, as such, is eligible for indexing within secondary index 410 that is restricted to indexing key/value pairs with the key "first_name".

In response to determining that row "0024" is eligible for indexing, graph database instance 232 automatically includes an identifier of row "0024" to a row in secondary index 410 that has a row-key that is based on the key/value pair with the key "first_name" as described in detail above. However, if a new row in a sparse data map that maintains application information is not eligible for secondary indexing within a particular secondary index based on criteria provided by administrators, information for the new row is not included in the particular secondary index. Different secondary indexes may have different administrator-indicated criteria, according to embodiments.

Graph Database System Architecture

As shown in FIG. 2, example DBMS 200 includes a client device 210 and a server device 230 communicatively coupled via a network 220. Example DBMS 200 may include other entities or devices, including client devices, server devices, and storage devices, according to embodiments.

Client device 210 may be implemented by any type of computing device that is communicatively connected to network 220. Example implementations of client device 210 include, without limitation, workstations, personal computers, laptop computers, personal digital assistants (PDAs), tablet computers, cellular telephony devices such as smart phones, and any other type of computing device.

In DBMS 200, client device 210 is configured with a database client 212. Database client 212 may be implemented in any number of ways, including as a stand-alone application running on client device 210, or as a plugin to a browser running at client device 210, etc.

Client device 210 also is configured with an application 214, which is a computer system process executing software that causes the process to interact with database client 212 as described in detail above. Furthermore, application 214 may run from a different device than client device 210. Client device 210 may be configured with other mechanisms, processes and functionalities, depending upon a particular implementation.

Network 220 may be implemented with any type of medium and/or mechanism that facilitates the exchange of information between client device 210, server device 230, and if needed, other entities. Furthermore, network 220 may facilitate use of any type of communications protocol, and may be secured or unsecured, depending upon the requirements of a particular embodiment.

Server device 230 may be implemented by any type of computing device that is communicatively connected to network 220. Server device 230 may be a node in a multi-node DBMS or may function independently of any other nodes. In DBMS 200, server device 230 is configured with a graph database instance 232 that implements the database server that manages application data maintained within system 200. Server device 230 may be configured with other mechanisms, processes and functionalities, depending upon a particular implementation.

According to one or more embodiments, graph database instance 232 includes a secondary indexing application that comprises a combination of secondary indexing software and an allocation of resources from server device 230. Database clients submit requests to store and retrieve graph data to the secondary indexing application. The secondary indexing software is configured to create, manage, and utilize secondary index sparse data maps, as described above, based on the requests from the database clients.

The secondary indexing application utilizes a graph database management system as a backend to create sparse data maps and to store and manage both application data and secondary index data within the sparse data maps. The backend simply receives instructions from the secondary indexing application to create and populate sparse data maps, and to manipulate the data stored in the sparse data maps, without requiring the graph database management system backend to distinguish secondary index sparse data maps from application data sparse data maps.

For example, a graph database management system may be a "no-SQL" backend such as Apache HBase. Information about Apache HBase is found in the Apache HBase Reference Guide, version 2.0.0, the entire contents of which is hereby incorporated by reference as if fully set forth herein.

Server device 230 is communicatively coupled to a database 240. Server device 230 may communicate with at least a portion of database 240 via network 220. Database 240 may represent an unsharded database, or may represent a sharded database (which is managed by one or more graph database instances including graph database instance 232). An unsharded database is implemented such that all of the contents of the database are stored using the same computing resources, such as processors, memory, and disk space.

A sharded database, however, is divided up into shards, where each database shard is managed by its own database instance, which maintains data on computing resources (such as processors, memory, and disk space) dedicated to the shard. In a sharded database, a given database shard may store the entirety of a given data structure, or alternatively, a given data structure may be horizontally partitioned among two or more of the database shards. Horizontal partitioning in a sharded database involves splitting a database data structure, such as sparse data map 310, secondary index 410, or secondary index 420, across shards of the database so that each shard contains a subset of rows of the horizontally-partitioned data structure. The data collectively stored in the shards of the database for a given data structure (such as map 310) is equivalent to the data logically known to be stored in the given data structure.

A sharded database is logically treated as a single database, and thus is accessible by client applications just like an unsharded database. According to embodiments in which database 240 represents a sharded database, references to data stored within database 240 may refer to data stored in any one or more shards of the sharded database.

According to one or more embodiments, each of the processes and/or functionality described in connection with graph database instance 232, client 212, and application 214 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Management Systems

Embodiments of the present invention are used in the context of database management systems (DBMS). Therefore, a description of a DBMS is useful. A DBMS manages a database. A DBMS may comprise one or more database servers. A database comprises database data and a database dictionary that are stored on a persistent memory mechanism, such as one or more disks storing data for database 240. Database data may be stored in one or more logical data containers.

Users may interact with an instance of a database server of a DBMS by submitting, to graph database instance 232, commands that cause graph database instance 232 to perform operations on data stored in a database. For example, a user (such as application 214) at client device 210 submits, via database client 212, a database command to graph database instance 232 with which database client 212 maintains a connection. A user may be one or more applications running on the client device that cause the database client to interact with graph database instance 232. Multiple parties may access database resources through a given application. Multiple parties and/or users may also be referred to herein, collectively, as a user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
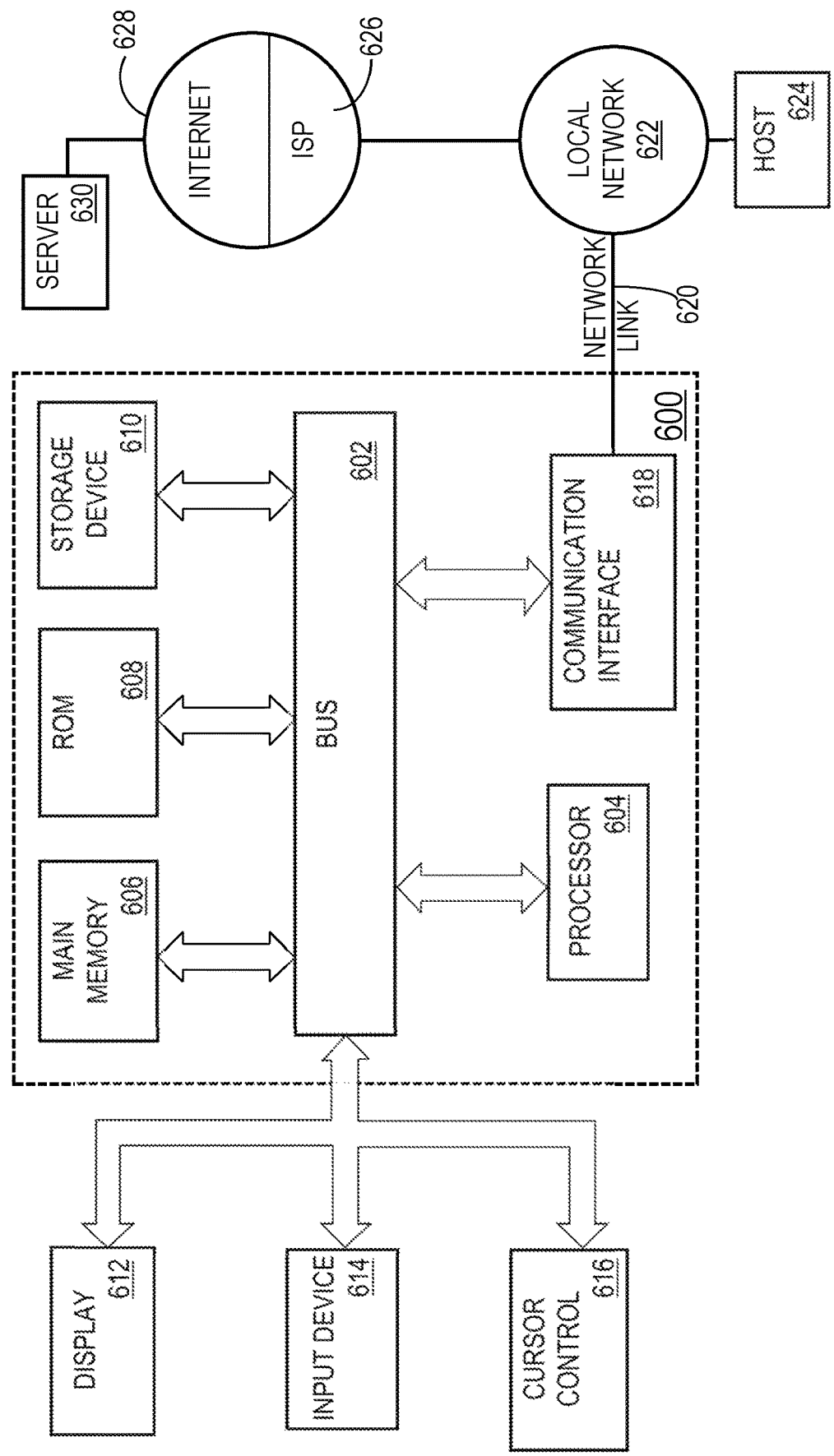
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 7:
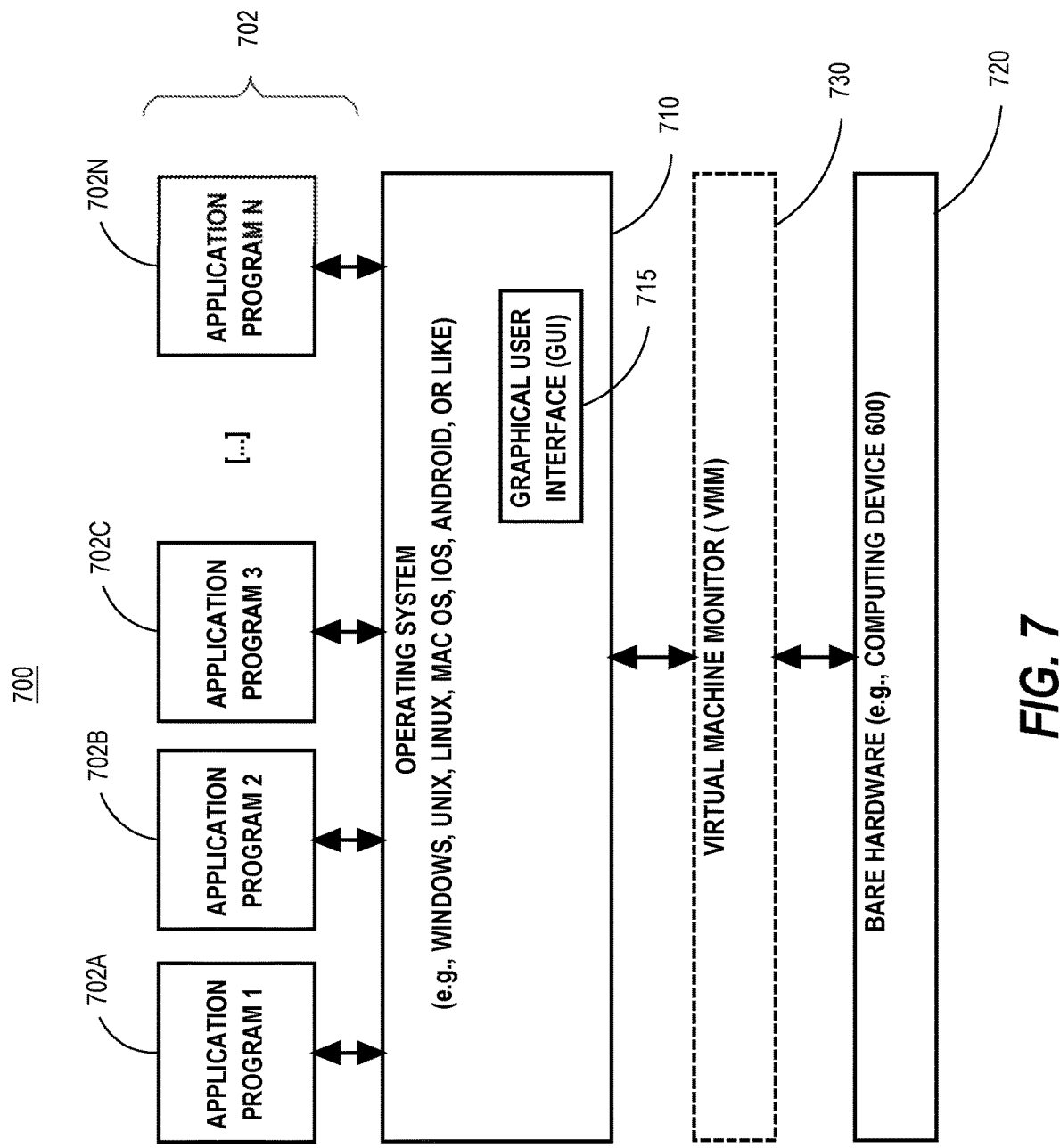
FIG. 7 is a block diagram of a basic software system that may be employed for controlling the operation of a computer system.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A computer-implemented method comprising:
    maintaining data within one or more sparse data maps;
    wherein each sparse data map, of the one or more sparse data maps, is a data store comprising a set of rows that are identified by respective row-keys;
    wherein each row, of the set of rows, comprises a data payload that comprises one or more key/value pairs each including a key and an associated value;
    including, in a particular data payload of a first row of the one or more sparse data maps, a particular key/value pair that comprises a particular key and a particular associated value;
    in response to including the particular key/value pair in the particular data payload of the first row, automatically maintaining a secondary index sparse data map, which indexes data from the one or more sparse data maps, by:
        applying at least one hash function to the particular key/value pair to produce one or more hash values;
        generating a row-key value based on the one or more hash values; and
        adding an identifier of the first row within a data payload of a secondary index row, of the secondary index sparse data map, that is identified based on a secondary index row-key that comprises the generated row-key value;
    wherein the secondary index sparse data map is a data store comprising a set of rows (a) that are identified by respective row-keys, and (b) that store one or more respective data payloads;
    wherein the method is performed by one or more computing devices.

2. The method of claim 1, wherein the first row is a new row in the one or more sparse data maps, the method further comprising:
    assigning a bucket identifier value, that is within a predetermined range of values, to the first row;
    wherein the secondary index row-key further comprises the bucket identifier value.

3. The method of claim 2, wherein the row-key value includes the one or more hash values, and wherein the bucket identifier value is included after the one or more hash values within the secondary index row-key.

4. The method of claim 2, wherein the row-key value includes the one or more hash values, and wherein the bucket identifier value is included before the one or more hash values within the secondary index row-key.

5. The method of claim 2, wherein assigning the bucket identifier value to the first row comprises generating the bucket identifier value randomly.

6. The method of claim 1, wherein adding the identifier of the first row within the data payload of the secondary index row of the secondary index sparse data map comprises:
    determining that a row that is identified by the secondary index row-key does not exist within the secondary index sparse data map;
    in response to determining that a row that is identified by the secondary index row-key does not exist within the secondary index sparse data map, adding the secondary index row to the secondary index sparse data map;
    wherein the secondary index row is associated with the secondary index row-key; and
    populating the secondary index row with the identifier of the first row.

7. The method of claim 1, wherein adding the identifier of the first row within the data payload of the secondary index row of the secondary index sparse data map comprises adding the identifier of the first row to data stored in the data payload of the secondary index row.

8. The method of claim 1, wherein:
    the secondary index row of the secondary index sparse data map stores a set of key/value pairs;
    the identifier of the first row within the secondary index row is formatted as an identifier key/value pair comprising a key and an associated value;
    the key of the identifier key/value pair comprises a row-key of the first row; and
    the associated value of the identifier key/value pair is null.

9. The method of claim 1, further comprising:
prior to adding the identifier of the first row within the data payload of the secondary index row of the secondary index sparse data map:
  querying the secondary index sparse data map to retrieve an identifier row-key from a row of the secondary index sparse data map that is identified by a test secondary index row-key that comprises the generated row-key value;
  determining whether any key/value pair, stored within a data payload of a row of the one or more sparse data maps that is identified by the retrieved identifier row-key, matches the particular key/value pair;
  in response to determining that no key/value pair, stored within the data payload of the row of the one or more sparse data maps that is identified by the retrieved identifier row-key, matches the particular key/value pair: causing the secondary index row-key to further comprise a collision identifier.

10. The method of claim 1, further comprising:
prior to adding the identifier of the first row within the data payload of the secondary index row of the secondary index sparse data map:
  querying the secondary index sparse data map to retrieve an identifier row-key from a row of the secondary index sparse data map that is identified by a test secondary index row-key that comprises the generated row-key value;
  determining whether any key/value pair, stored within a data payload of a row of the one or more sparse data maps that is identified by the retrieved identifier row-key, matches the particular key/value pair;
  in response to determining that at least one key/value pair, stored within the data payload of the row of the one or more sparse data maps that is identified by the retrieved identifier row-key, matches the particular key/value pair, adding the identifier of the first row within the data payload of the secondary index row of the secondary index sparse data map.

11. One or more non-transitory computer-readable media storing instructions that, when executed by one or more processors, cause:
  maintaining data within one or more sparse data maps;
  wherein each sparse data map, of the one or more sparse data maps, is a data store comprising a set of rows that are identified by respective row-keys;
  wherein each row, of the set of rows, comprises a data payload that comprises one or more key/value pairs each including a key and an associated value;
  including, in a particular data payload of a first row of the one or more sparse data maps, a particular key/value pair that comprises a particular key and a particular associated value;
  in response to including the particular key/value pair in the particular data payload of the first row, automatically maintaining a secondary index sparse data map, which indexes data from the one or more sparse data maps, by:
    applying at least one hash function to the particular key/value pair to produce one or more hash values;
    generating a row-key value based on the one or more hash values; and
    adding an identifier of the first row within a data payload of a secondary index row, of the secondary index sparse data map, that is identified based on a secondary index row-key that comprises the generated row-key value;
  wherein the secondary index sparse data map is a data store comprising a set of rows (a) that are identified by respective row-keys, and (b) that store one or more respective data payloads.

12. The one or more non-transitory computer-readable media of claim 11, wherein the instructions further comprise instructions that, when executed by one or more processors, cause:
  wherein the first row is a new row in the one or more sparse data maps;
  assigning a bucket identifier value, that is within a predetermined range of values, to the first row;
  wherein the secondary index row-key further comprises the bucket identifier value.

13. The one or more non-transitory computer-readable media of claim 12, wherein the row-key value includes the one or more hash values, and wherein the bucket identifier value is included after the one or more hash values within the secondary index row-key.

14. The one or more non-transitory computer-readable media of claim 12, wherein the row-key value includes the one or more hash values, and wherein the bucket identifier value is included before the one or more hash values within the secondary index row-key.

15. The one or more non-transitory computer-readable media of claim 12, wherein assigning the bucket identifier value to the first row comprises generating the bucket identifier value randomly.

16. The one or more non-transitory computer-readable media of claim 11, wherein adding the identifier of the first row within the data payload of the secondary index row of the secondary index sparse data map comprises:
  determining that a row that is identified by the secondary index row-key does not exist within the secondary index sparse data map;
  in response to determining that a row that is identified by the secondary index row-key does not exist within the secondary index sparse data map, adding the secondary index row to the secondary index sparse data map;
  wherein the secondary index row is associated with the secondary index row-key; and
  populating the secondary index row with the identifier of the first row.

17. The one or more non-transitory computer-readable media of claim 11, wherein adding the identifier of the first row within the data payload of the secondary index row of the secondary index sparse data map comprises adding the identifier of the first row to data stored in the data payload of the secondary index row.

18. The one or more non-transitory computer-readable media of claim 11, wherein:
  the secondary index row of the secondary index sparse data map stores a set of key/value pairs;
  the identifier of the first row within the secondary index row is formatted as an identifier key/value pair comprising a key and an associated value;
  the key of the identifier key/value pair comprises a row-key of the first row; and
  the associated value of the identifier key/value pair is null.

19. The one or more non-transitory computer-readable media of claim 11, wherein the instructions further comprise instructions that, when executed by one or more processors, cause:
  prior to adding the identifier of the first row within the data payload of the secondary index row of the secondary index sparse data map:

querying the secondary index sparse data map to retrieve an identifier row-key from a row of the secondary index sparse data map that is identified by a test secondary index row-key that comprises the generated row-key value;

determining whether any key/value pair, stored within a data payload of a row of the one or more sparse data maps that is identified by the retrieved identifier row-key, matches the particular key/value pair;

in response to determining that no key/value pair, stored within the data payload of the row of the one or more sparse data maps that is identified by the retrieved identifier row-key, matches the particular key/value pair: causing the secondary index row-key to further comprise a collision identifier.

20. The one or more non-transitory computer-readable media of claim 11, wherein the instructions further comprise instructions that, when executed by one or more processors, cause:

prior to adding the identifier of the first row within the data payload of the secondary index row of the secondary index sparse data map:

querying the secondary index sparse data map to retrieve an identifier row-key from a row of the secondary index sparse data map that is identified by a test secondary index row-key that comprises the generated row-key value;

determining whether any key/value pair, stored within a data payload of a row of the one or more sparse data maps that is identified by the retrieved identifier row-key, matches the particular key/value pair;

in response to determining that at least one key/value pair, stored within the data payload of the row of the one or more sparse data maps that is identified by the retrieved identifier row-key, matches the particular key/value pair, adding the identifier of the first row within the data payload of the secondary index row of the secondary index sparse data map.

21. The method of claim 1, wherein applying the at least one hash function to the particular key/value pair to produce one or more hash values comprises:

hashing the particular key to produce a key-based hash value; and hashing the particular associated value to produce a value-based hash value;

wherein the one or more hash values comprise the key-based hash value and the value-based hash value.

22. The one or more non-transitory computer-readable media of claim 11, wherein applying the at least one hash function to the particular key/value pair to produce one or more hash values comprises:

hashing the particular key to produce a key-based hash value; and hashing the particular associated value to produce a value-based hash value;

wherein the one or more hash values comprise the key-based hash value and the value-based hash value.

23. The method of claim 21, wherein generating the generated row-key value based on the key-based hash value and the value-based hash value comprises concatenating the key-based hash value and the value-based hash value to produce the generated row-key value.

24. The one or more non-transitory computer-readable media of claim 22, wherein generating the generated row-key value based on the key-based hash value and the value-based hash value comprises concatenating the key-based hash value and the value-based hash value to produce the generated row-key value.

* * * * *